No. 840,267. PATENTED JAN. 1, 1907.
G. S. STEBBINS.
CLOTHES DRYING FRAME.
APPLICATION FILED FEB. 26, 1906.
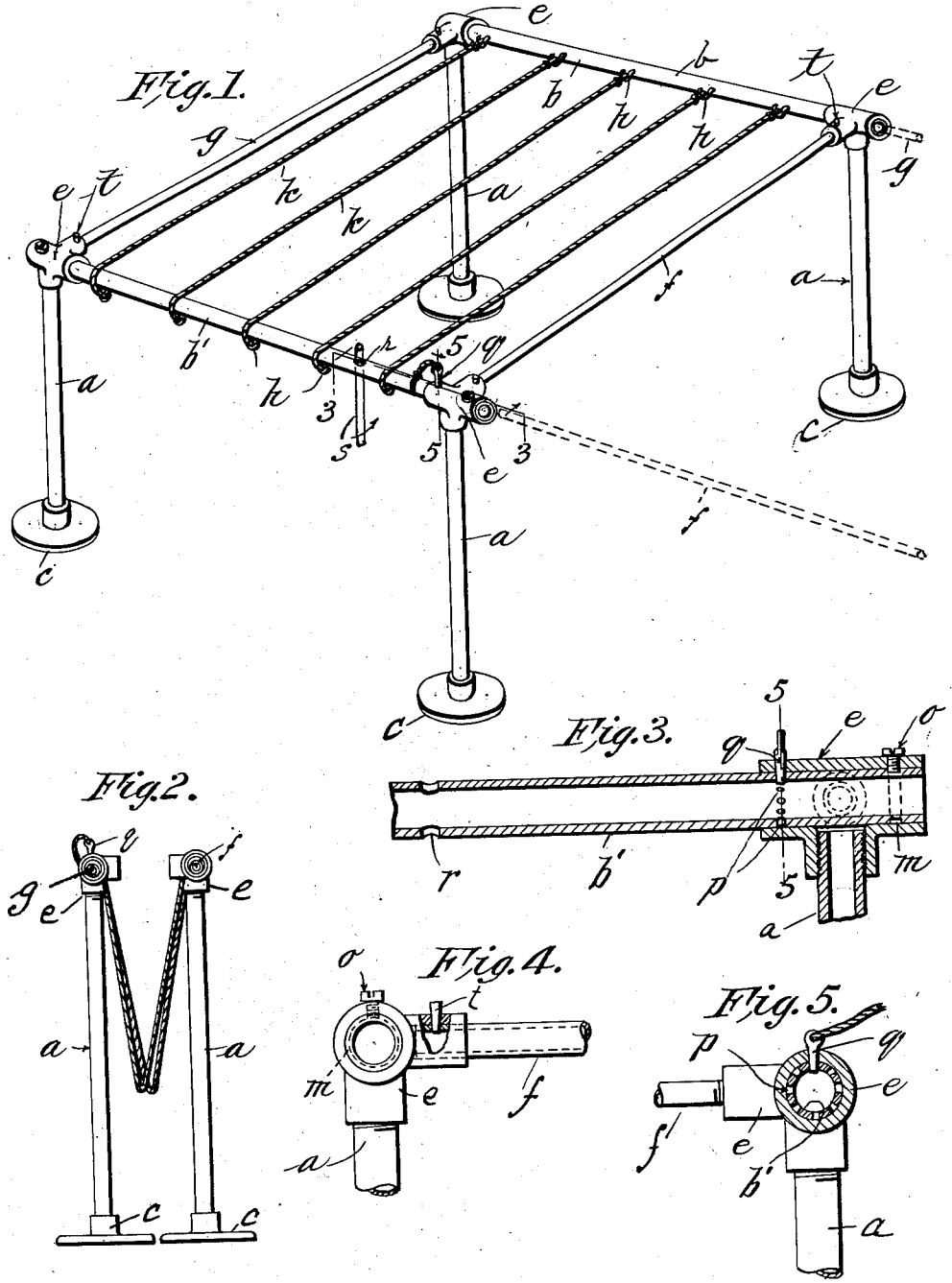
Witnesses:
H. L. Sprague.
E. H. Scoholm.
Inventor:
George S. Stebbins
Chapin & Co
Attorneys.

UNITED STATES PATENT OFFICE.

GEORGE S. STEBBINS, OF SPRINGFIELD, MASSACHUSETTS.

CLOTHES-DRYING FRAME.

No. 840,267.  Specification of Letters Patent.  Patented Jan. 1, 1907.

Application filed February 26, 1906. Serial No. 302,836.

*To all whom it may concern:*

Be it known that I, GEORGE S. STEBBINS, a citizen of the United States of America, residing at Springfield, in the county of Hampden and State of Massachusetts, have invented new and useful Improvements in Clothes-Drying Frames, of which the following is a specification.

This invention relates to a movable clothes-drying frame, the object thereof being to provide a frame for this purpose having all the characteristics of the ordinary rectangularly-arranged posts and bars, but embodying means to tighten the ropes, provision also being made for taking down the frame to permit of stowing it away in a relatively small space when not in use and also for supporting the frames in operative position without nserting the same in the ground.

In the drawings forming part of this application, Figure 1 is a perspective view of the complete frame, certain parts thereof being shown in dotted lines in another position. Fig. 2 is an end elevation of the two end frames, the side bars being removed. This shows the take-down position of the frames. Fig. 3 is a sectional elevation through the top bar of one of the end frames, the plane thereof being indicated by the dotted line 3 3, Fig. 1. Fig. 4 is an end elevation of one of the uprights and a portion of one of the side bars extending from the top of one end frame to another, a portion of the coupling being broken away. Fig. 5 is a cross-sectional view on line 5 5, Fig. 3.

Referring to the drawings, the frame as a whole consists of two end frames, each of which comprises posts or uprights $a$ and a cross-bar, the latter being indicated in the two frames, respectively, by $b$ and $b'$. These uprights or posts $a$ are preferably made of iron pipe, to the lower end of which is secured a broad metal foot or base $c$, which is of sufficient area to properly support the weight of the frame on turf or soft ground. The upper end of each post is surmounted by a double T-coupling $e$, into which are entered, respectively, the cross-bars $b$ and $b'$, the former being fixed and the latter being rotatably supported in these couplings. Into the other part of these couplings and rectangularly disposed relative to the side bars $b$ $b'$ are entered and removably secured the two transverse brace-bars $f$ and $g$, which are preferably tubular and made of piping smaller in diameter than the bars $b$ and $b'$ to the end that they may be inserted in the latter, as shown in dotted lines in Fig. 1 and in end elevation in Fig. 3, when the frame is taken down to be stowed away.

In the bars $b$ and $b'$ are hooks or projections $h$, to which the rope $k$ may be secured in any suitable way either by having their opposite ends directly attached to the hooks or by making the rope in one piece and lacing it back and forth in the usual manner. One of the bars, as $b'$, is, as stated, rotatably mounted in the couplings $e$ of one of the frames, the ends of the bar being annularly grooved, as at $m$, Figs. 3 and 4, and a screw or pin $o$ located in the coupling, with its end in said groove to hold the bar against endwise movement, while permitting its rotation. Within the length of the coupling holes $p$ are bored through the bar $b'$, and in the plane of these holes a locking-pin $q$ passes through a hole in the coupling and into one of the holes $p$, whereby when the bar has been rotated to tighten the ropes the pin $q$ may be used for locking the bar in its adjusted position.

To rotate the bar $b'$, a hole, as $r$, Fig. 3, is bored therethrough, into which a rod $s$, as shown in Fig. 1, may be introduced to provide the required leverage to tighten the ropes $k$ to the proper degree.

The transverse brace-rods $f$ and $g$ preferably are loosely entered into the couplings $e$ and secured therein by means of the pins $t$ (shown in detail in Fig. 4) and passing through the coupling and through a hole in the ends of these bars in the same way that the locking-pin $q$ passes through the bar $b'$.

To take down the frame for stowing away, the ropes $k$ may be loosened and the bars $g$ and $f$ then removed and placed inside the bars $b$ and $b'$, and the two end frames may then be set up close together, as shown in Fig. 2, out of the way, occupying in their nested position but a very small amount of room.

Having thus described my invention, what I claim, and desire to secure by Letters Patent of the United States, is—

1. A clothes-drying frame comprising two substantially rectangluar side frames each consisting of two uprights and a cross-bar, one of which bars is rotatable; transverse bars extending from the ends of each side frame to the other, and means to secure a rope to the two cross-bars together with locking means to secure the rotatable cross-bar against unwinding movement, in combination with a broad circular supporting-piece for the lower ends of the uprights.

2. A clothes-drying frame comprising two substantially rectangular side frames, each consisting of two uprights and a cross-bar, one of the latter being rotatable; a flat foot broader than the base of the uprights, located at the lower end of each of the latter, and parallel transverse bars extending from the ends of each side frame to the other and removably engaging the latter, and projections on the cross-bars to which a rope may be secured to extend from one side frame to the other; means to rotate one of said cross-bars, and a locking device to secure the rotatable bar against unwinding movement.

3. In a clothes-drier in combination, two substantially rectangular frames including a fixed and a rotatable cross-bar having circular bearing-pieces at the lower ends of said frames, parallel transverse bars connecting the rectangular frames, said fixed and rotatable tubular cross-bars, the rotatable cross-bar having an annular groove at one end, double T-shaped corner-fastenings for securing the uprights, fixed, and rotatable cross-bars and side transverse connecting-bars together, removable locking means therefor, means for securing a rope to the fixed and rotatable cross-bars, and means for rotating the rotatable cross-bar, as described.

GEORGE S. STEBBINS.

Witnesses:
WM. H. CHAPIN,
K. I. CLEMONS.